US009170342B2

(12) United States Patent
Eick et al.

(10) Patent No.: US 9,170,342 B2
(45) Date of Patent: Oct. 27, 2015

(54) ACTIVE ISOLATION APPARATUS

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 389 days.

(21) Appl. No.: 13/874,000

(22) Filed: Apr. 30, 2013

(65) Prior Publication Data
US 2013/0286789 A1  Oct. 31, 2013

Related U.S. Application Data

(60) Provisional application No. 61/640,273, filed on Apr. 30, 2012.

(51) Int. Cl.
| | | |
|---|---|---|
| *G01V 1/155* | (2006.01) | |
| *G01V 1/09* | (2006.01) | |
| *G01V 1/02* | (2006.01) | |
| *G01V 1/145* | (2006.01) | |

(52) U.S. Cl.
CPC . *G01V 1/02* (2013.01); *G01V 1/145* (2013.01)

(58) Field of Classification Search
CPC ....... G01V 1/09; G01V 1/143; G01V 1/1047; G01V 1/147; G01V 1/145; G01V 1/155
USPC .......................................... 181/111, 114, 121
See application file for complete search history.

(56) References Cited

U.S. PATENT DOCUMENTS

| | | | | |
|---|---|---|---|---|
| 2,675,882 A | * | 4/1954 | Bazzoni et al. | 181/111 |
| 3,777,843 A | * | 12/1973 | Fair et al. | 181/114 |
| 4,056,164 A | | 11/1977 | Johnston | |
| 4,114,722 A | * | 9/1978 | Weber et al. | 181/114 |
| 4,133,409 A | * | 1/1979 | Mifsud et al. | 181/114 |
| 4,372,420 A | * | 2/1983 | White | 181/120 |
| 4,458,777 A | * | 7/1984 | Weber et al. | 181/121 |
| 4,519,053 A | | 5/1985 | Bedenbender et al. | |
| 4,651,044 A | * | 3/1987 | Kompanek | 310/323.17 |
| 4,718,049 A | | 1/1988 | Crowell et al. | |
| 4,853,906 A | * | 8/1989 | Cole | 367/189 |
| 5,520,375 A | | 5/1996 | Leibach et al. | |
| 5,614,670 A | * | 3/1997 | Nazarian et al. | 73/146 |
| 7,657,350 B2 | * | 2/2010 | Moran | 701/22 |
| 7,841,444 B2 | * | 11/2010 | Cannell et al. | 181/121 |

(Continued)

*Primary Examiner* — Ari M Diacou
(74) *Attorney, Agent, or Firm* — ConocoPhillips Company

(57) ABSTRACT

The invention is an electric sweep type seismic vibrator source of the type used in seismic prospecting for hydrocarbons. The source uses an engine and generator combination to create electric power for all systems on the source such as driving a frame of linear electric motors that direct a rod or piston to contact the ground in a recurring fashion along with driving the source from location to location through a survey area. The seismic source further includes an active isolation system that provides for significant weight on the ground through the rods of the linear electric motors, but protects the vehicle body and the remainder of the systems on the seismic source to be insulated from the harshest vibration related to the acoustic energy being applied to the ground. The active isolation system may include reactive elements such as pneumatic and hydraulic shock absorbers, but also includes active elements such as linear motors operated to counteract the impulsive forces from conveying through the frame of the seismic source.

16 Claims, 3 Drawing Sheets

(56) References Cited

U.S. PATENT DOCUMENTS

| | | | |
|---|---|---|---|
| 8,256,565 B2* | 9/2012 | Pabon et al. | 181/104 |
| 2003/0168277 A1* | 9/2003 | Hopperstad et al. | 181/111 |
| 2010/0232260 A1* | 9/2010 | Zowarka et al. | 367/189 |
| 2011/0209940 A1* | 9/2011 | Daraio | 181/139 |
| 2012/0037444 A1* | 2/2012 | Eick et al. | 181/114 |
| 2013/0155817 A1* | 6/2013 | Kim | 367/189 |

* cited by examiner

ACTIVE ISOLATION APPARATUS

CROSS-REFERENCE TO RELATED APPLICATIONS

This application is a non-provisional application which claims benefit under 35 USC §119(e) to U.S. Provisional Application Ser. No. 61/640,273 filed Apr. 30, 2012, entitled "Active Isolation Apparatus," which is incorporated herein in its entirety.

STATEMENT REGARDING FEDERALLY SPONSORED RESEARCH

None.

FIELD OF THE INVENTION

This invention relates to vibratory seismic sources and particularly to seismic sources that are held to the ground to deliver vibratory impulses into the earth for seismic prospecting of hydrocarbons and other subsurface resources.

BACKGROUND OF THE INVENTION

In the process of acquiring seismic data, seismic energy is delivered into the earth. Over the years, the preferred attributes of the seismic energy delivered into the earth have been honed to include a broad spectrum of wavelengths and sufficient power across the spectrum to be recorded at the surface. In general, a suitable land source must be able to deliver seismic energy waves in a spectrum of wavelengths from about 8 Hz up to 60-80 Hz. The source must have sufficient power across the spectrum so that the seismic waves have measurable amplitude at the surface after transiting deep into the earth, reflecting from or refracting through layers in the earth and transiting back to the surface. A last major characteristic of a desirable seismic source is that the energy from the source is distinguishable in the data record from seismic energy from other sources whether from background sources or other seismic prospecting.

Explosive charges have long been used as seismic sources although the intense release of energy is typically not permitted except in remote locations. Explosive sources, however, provide a wide array of wavelengths with considerable power across the wavelengths.

Hydraulic reciprocating seismic vibrators or vibes have been in use for many years using a baseplate connected to hydraulic rams that cause a reaction mass to reciprocate up and down to shake the ground through the baseplate. The hydraulic rams are operated to move the reaction mass through a sweep of the desired frequencies. However, the hydraulic systems are limited in their ability to provide sufficient power at high frequencies due to fluid limitations of hydraulic flow in and out of the hydraulic cylinders. At very high hydraulic velocities, the hydraulic fluid is subject to cavitation effects when reversing directions that limits the amplitude of the movement of the reaction mass and thus the energy input in to the earth. At low frequencies it is difficult for the hydraulic vibe to have enough travel to generate a low frequency wave into the ground. For example, consider how one would generate a one Hz wave with a hydraulic vibe. A very long throw of the reaction mass is needed to generate that wavelet because the mass has to be moving down and up the full one second.

BRIEF SUMMARY OF THE DISCLOSURE

The invention more particularly relates to a vibratory seismic source for delivering acoustic energy into the ground for seismic prospecting that includes a chassis and a generator for creating electric power and is mounted to the chassis. A plurality of linear motors are arranged in a grid and positioned to depend from the chassis wherein each linear motor includes a rod that is arranged to move generally vertically to contact the ground with a lower end of the rod. A control system is included for controlling movement of the rods such that the rods vibrate the ground and deliver acoustic energy into the ground. The source further includes an active isolation system arranged between the grid of linear motors and the chassis for absorbing at least a portion of the acoustic energy that is created by the linear motors and preventing the acoustic energy from conveying excessive vibration to the chassis and other portions of the seismic source.

The invention also relates to a process for delivering acoustic energy into the earth for seismic prospecting wherein electric power is created on a mobile seismic source and the electric power is used to power a plurality of linear electric motors and move a rods within each linear electric motor generally vertically to contact the ground with a lower end of the rod at the selected location. The movement of the rods is controlled such that the rods vibrate the ground and deliver acoustic energy into the earth. Moreover, the acoustic energy that might propagate back through the mobile seismic source is actively isolated with active isolation elements arranged between the plurality of linear electric motors and the remainder of the mobile seismic source.

"Generally vertical" or "generally vertically" should be interpreted as meaning "with an axis of movement sufficiently nearly vertical with respect to the ground so as effectively to impart energy to the ground." Normally, the axis of movement would be less than 20 degrees to vertical, or in another embodiment less than 10 degrees to vertical.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
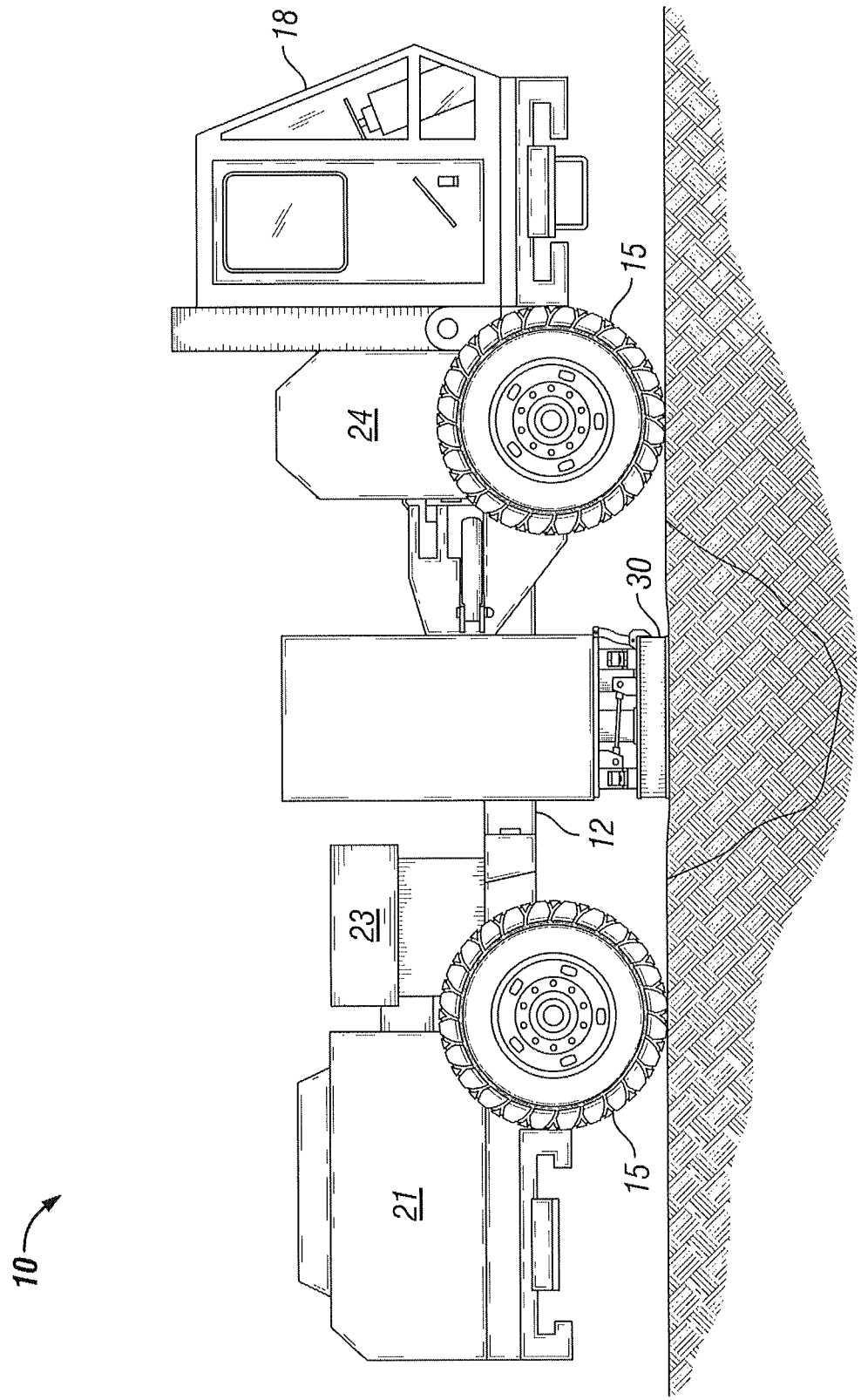
FIG. 1 is an elevation view of a discrete electric seismic source unit.

As shown in FIG. 1, an alternative vibrator seismic source 10 is shown comprising a chassis 12, four wheels 15 and a driver's cab 18. The alternative vibrator actuator source 10 uses a diesel engine 21 to turn an electric generator 23 and uses electric power to power the source 10 both for delivering acoustic energy into the ground and for moving along the ground from location to location. The source 10 utilizes electricity for all of its power needs. A large electric power accumulator 24 such as a battery or capacitor is included to store energy for high electric demand situations or when there are problems with the generator 23, but the accumulator 24 provides the power to return to a location for repair. By including a large electric power accumulator 24, the diesel engine 21 and electric generator 23 may be sized and engineered to deliver some electric power output lower than peak demand utilizing the accumulator to meet the highest needs. As such, the seismic source 10 may be smaller and obtained at lower cost and may have a lower operating cost to provide equivalent acoustic energy output.

Figure 2:
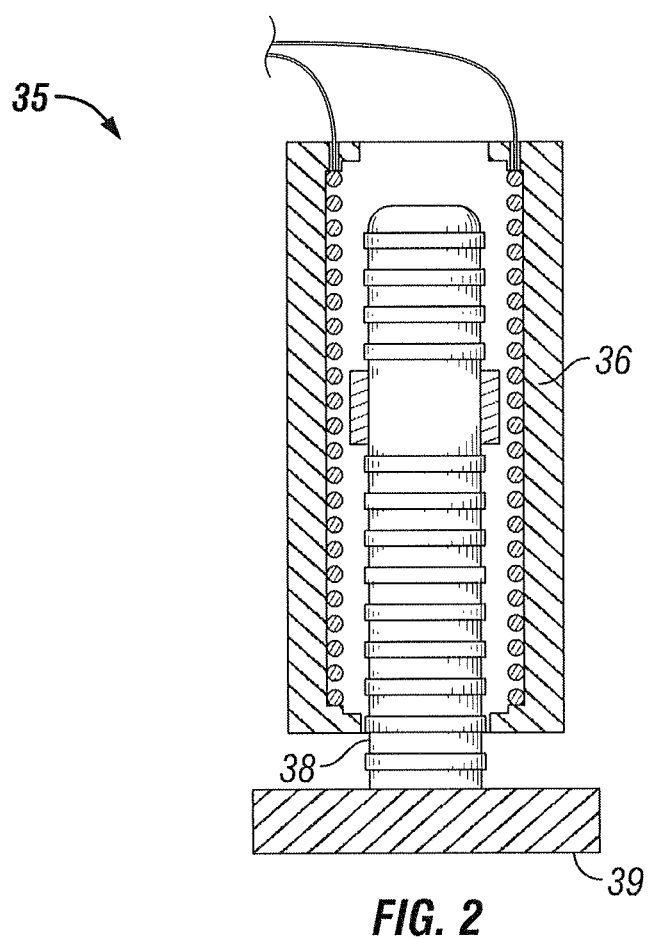
FIG. 2 is an enlarged fragmentary view of an electromechanical linear motor assembly for delivering seismic energy into the ground.
Figure 3:
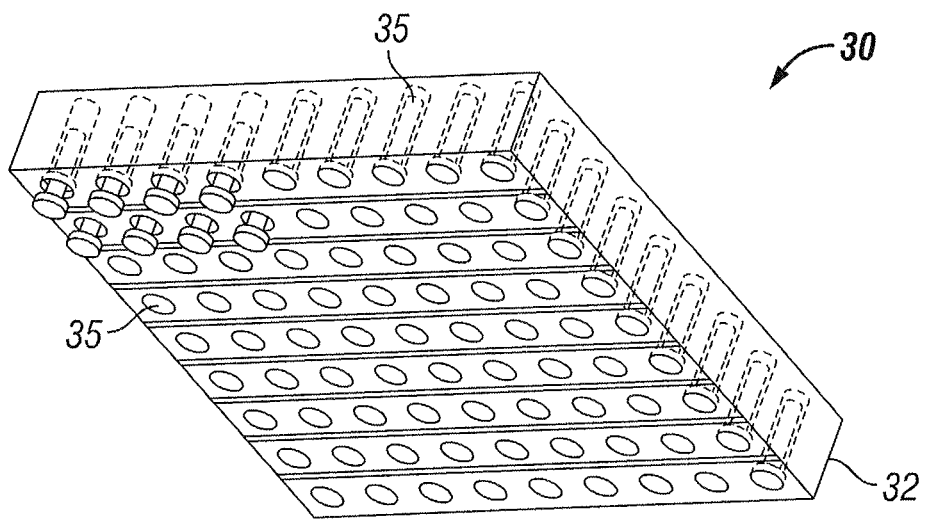
FIG. 3 is an enlarged perspective fragmentary view of a grid of electro mechanical linear motor assemblies for cooperatively delivering seismic energy into the ground.

Referring now to FIGS. 2 and 3, the acoustic energy delivery system 30 is carried under the chassis 12 and comprises a frame 32 that carries a number of linear motors 35. Linear motors are commercially available equipment and each manufacturer has variations on the design, but in principal, each linear motor 35 includes a tubular body 36 and a rod or actuation bar 38 positioned within the tubular body 36 that extends telescopically from the lower end of the tubular body 36. A replaceable foot 39 is attached to the bottom end of the rod 38 for contacting the ground. The frame 32 includes mounts for a grid of linear motors 35. In one envisioned embodiment, the frame 32 has approximately 112 linear motors 35 arranged in a grid of perhaps 8 by 14. Each linear motor is capable of outputting a peak acceleration force of approximately 2400 Newtons (N) or approximately 540 pounds-force while using 34 amp RMS (Arms) at 240 volts AC. The 112 linear motors would then be capable of outputting 268,800 N or 60,480 pounds-force using approximately 914 kilowatts of power. An additional advantage to the linear motor is that they come in varying sizes and force output that that can be tuned to achieve a desired acceleration and sustained velocity of motion. Also the electronic control for the linear motor is will understood because of the wide use in manufacturing applications. The selection of the specific linear motors is an engineering issue at production time because they can be sourced to have a large thrust force but with short strokes as compared to those that have longer strokes with less thrust, but higher speeds.

In operation, the frame 32 is lowered into proximity to the ground G and the linear motors 35 are operated to lower the replaceable feet 39 into contact with the ground G. Once all of the replaceable feet 39 are in contact with the ground G, the linear motors 35 are activated to thrust the rods 38 toward the ground G and deflect the ground G and thereby deliver an impulse into the earth. The linear motors 35 are quickly operated to recoil the rods 38 without disengaging contact with the ground G by the replaceable feet 39. By successive thrusts and recoils, a sweep of acoustic energy is effectively delivered into the earth while the feet remain in contact with the ground G. It should be noted that the undulations and irregularities of the ground G may be accommodated avoiding decoupling across the dimension of the frame 32 because each motor is independently controlled and operated. This method may be arranged to automatically compensate for surface topographic variations along with soft and hard spots on the ground surface like rocks or logs. While it is recognized that ground typically does not deflect much, it does not take much deflection with a 60,000 pound vibrator holding the replaceable feet 39 to the ground G to deliver very useful acoustic energy. In this procedure, all of the linear motors 35 would be operated at the same time using electrical power created by the electric generator 23 although, it is preferred that the electric generator 23 is sized to provide a peak energy production that less than the needs for operating all of the linear motors 35 in a manner where energy for operating the linear motors 35 would be supplied by a combination of energy stored in the energy accumulator 24 and the electric generator 23. The impulses would be repeated in a sequence where the impulse would occur with progressively increasing or decreasing rapidity such that a progression of frequencies of impulse forces would effectively deliver acoustic energy into the earth. As an example, the acoustic energy is generally characterizeable as some form of a progressive or variable sweep of frequencies covering a spectrum from about 1 Hz up to at least 80 Hz and preferably up to 120 Hz.

The electric linear motors 35, working in conjunction, would not suffer the limitations of the hydraulic pumping systems at high frequency. Applying and reversing electric power instantly to the linear motors 35 causes movement of the rods 38 within the tubular bodies 36, and the impulse frequency range is greatly expanded. By using electrical control circuits that are commonly available for diesel electric train locomotives and hybrid cars, the power can be applied instantly with a very high degree of control and stabilization. Linear motors are highly controllable due to the ability to control the force and velocity of the actuator bar 38 via changes in the voltage and amperage of the applied current. Also, the back-EMF generated can be accurately used as a feedback circuit to compensate for variations in the wear patterns and ground impedance variations so that the combined sweep of the whole group of linear motors is consistent and repeatable.

It should be recognized that higher frequencies than typically delivered may be achievable by the source 10. Perhaps frequencies as high as 200 Hz or higher may become useful in the field of seismic prospecting. There is no recognized reason that source 10 cannot deliver such high frequency acoustic energy into the ground G. And it is generally understood that high frequency energy provides high resolution data. Unfortunately, high frequency energy attenuates in the earth more rapidly than low frequency energy. With a large number of linear electric motors, whether 200, more than 200, possibly more than 2000 or less than 200 possibly less than 100, will be able to deliver high energy at high frequency. The size of the linear motors may be reduced or increased to adjust and adapt to ideal energy delivery system to create an optimal frequency range with high energy across the spectrum.

The selection of the specific linear motors is an engineering issue at production time because they can be sourced to have a large thrust force but with short strokes as compared to those that have longer strokes with less thrust, but higher speeds. During the engineering phase, this balance of the speed, overall thrust and power draw can be optimized so that the seismic sources can be optimized for the desired output.

Figure 4:
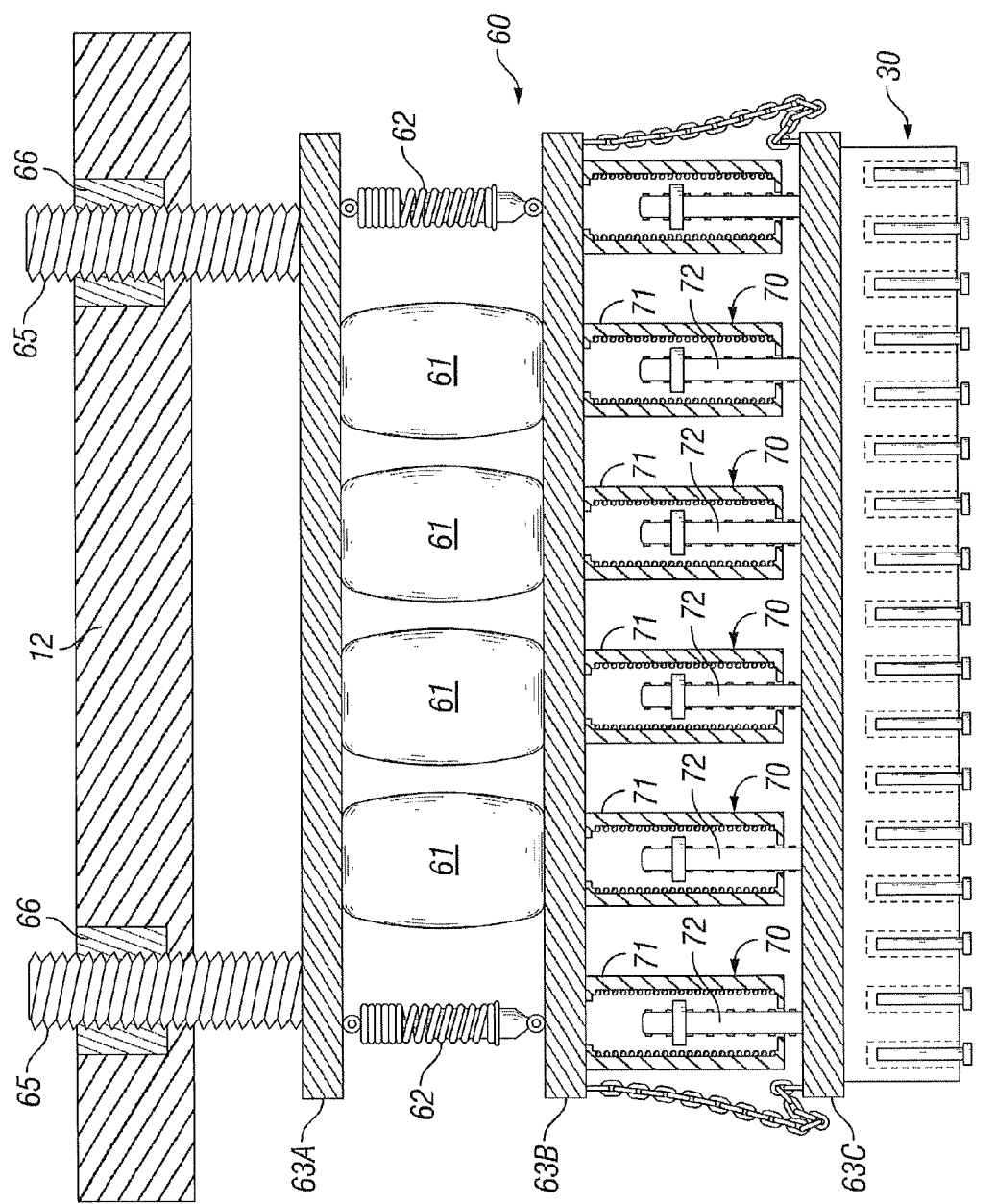
FIG. 4 shows an enlarged view of the active isolation system that is between the grid of the electromechanical linear motor assemblies and the frame of the seismic source to protect the body and systems on the seismic source from the harshest vibration related to the seismic energy being delivered into the ground.

It is anticipated that systems utilizing electromechanical linear motors may create high intensity vibrations which will hopefully provide better results in the seismic data record. However, it is equally likely to destroy or dramatically shorten the useful life of an all electric seismic source. Such vibration may cause metal fatigue and challenge the internals of all the electrical components including the battery 24, the diesel engine 21 and really the entire source 10 above the acoustic delivery system 30. An active isolation system 60, shown in FIG. 4 is provided to isolate the harshest vibration from the chassis 12.

The active isolation system 60 connects the acoustic energy delivery system 30 to the chassis 12 and isolates the chassis 12 using heavy duty pneumatic shock absorbing bags that may be similar to pneumatic bags used in the suspensions of heavy duty trucks, along with conventional spring and hydraulic shock absorbers 62, also comparable to those used in vehicle suspensions. These pneumatic shock absorbing bags 61 and spring and hydraulic shock absorbers 62 may be arranged in any suitable manner such as shown with structural members 63A and 63B so as to be carried under the seismic source 10 while the source 10 is in transit but also arranged to support much of the weight of a very heavy seismic source 10 when delivering acoustic energy to the ground. The structural member 63A may also be attached to the chassis through a lift mechanism to raise and lower the acoustic energy delivery system 30 such as screw posts 65 and stepper motors 66 arranged with corresponding screw threaded portions to cause the active isolation system 60 and the acoustic energy delivery system 30.

The active isolation system 60 further includes active shock absorbing elements 70 which are linear motors comparable to the linear motors 35. The active shock absorbing elements 70 including a shaft 72 received telescopically into a body 71. The shaft 72 and body 71, between the two have magnets and wiring wherein an electric current in the wiring creates an electromagnetic field that causes movement or resists movement of the shaft 72 relative to the body 71. The active shock absorbing elements 70 are positioned between structural members 63B and 63C where frame 32 is attached to structural member 63C. It should be recognized that there are a myriad of acceptable arrangements of active and reactive shock absorbers for insulating the chassis 12 and the related components of the source 10 from the intense vibrations and shocks associated with delivering seismic energy into the earth.

In operation, the acoustic energy delivery system 30 is lowered into proximity to the ground using the screw posts 65 and step motors 66 until some significant portion of the weight of the seismic source 10 is applied to the ground G through the acoustic energy delivery system 30. The acoustic energy delivery system 30 is then operated to provide a sequence of impulses where the rods 38 push rapidly toward the ground to deflect the ground and then let off or back off the force and then and then a next impulse in the series or sequence of impulses. Each of these impulses inherently create a counter impulse back through the active isolation system 60 where some of the impulsive forces are absorbed by the pneumatic bag shack absorbers 61 and spring and hydraulic shock absorbers 62. However, the magnitude of the impulses may be anticipated by electric circuitry that is operating the acoustic energy delivery system 30 and actively counteract the impulse or contain a significant portion of the impulse within the active isolation system 60 that includes both active and reactive elements.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A vibratory seismic source for delivering acoustic energy into the ground for seismic prospecting, the source comprising:
  a) a chassis;
  b) a generator for creating electric power mounted to the chassis;
  c) about 100 to 5,000 linear motors arranged in a grid, carried by a frame, and positioned to depend from the chassis and wherein each linear motor includes a rod that is arranged to move generally vertically to contact the ground with a lower end of the rod;
  d) a control system for controlling movement of the rods such that the rods vibrate the ground and deliver acoustic energy into the ground; and
  e) an active isolation system arranged between the grid of linear motors and the chassis for absorbing at least a portion of the acoustic energy that is created by the linear motors and preventing the acoustic energy from conveying excessive vibration to the chassis and other portions of the seismic source.

2. The vibratory seismic source according to claim 1, wherein the linear motors are carried by a frame, and the source includes an electric powered system to raise and lower the frame to the ground so that the rods may be operated into contact with the ground and raised up and clear of the ground when the source is moved from location to location.

3. The vibratory seismic source according to claim 1, further including a diesel engine to drive the generator.

4. The vibratory seismic source according to claim 1, wherein the actively isolation system includes active shock absorber elements that are powered and controlled to actively counteract the propagation of the acoustic energy back to the remainder of the seismic source.

5. The vibratory seismic source according to claim 4, wherein the active isolation system further include reactive shock absorbers.

6. The vibratory seismic source according to claim 5, wherein the reactive shock absorbers include pneumatic bladder elements.

7. The vibratory seismic source according to claim 5, wherein the reactive shock absorbers include hydraulic shock absorbers.

8. The vibratory seismic source according to claim 5, wherein the reactive shock absorbers include at least one spring.

9. A process for delivering acoustic energy into the earth for seismic prospecting, the process comprising:
  a) creating electric power on a mobile seismic source;
  b) using the electric power to power about 100 to 5,000 linear electric motors and move a rods within each linear electric motor generally vertically to contact the ground with a lower end of the rod at the selected location, wherein the linear electric motors are carried by a frame;
  c) controlling movement of the rods such that the rods vibrate the ground and deliver acoustic energy into the earth; and
  d) actively isolating the acoustic energy that might propagate back through the mobile seismic source with active isolation elements arranged between the plurality of linear electric motors and the remainder of the mobile seismic source.

10. The process for delivering acoustic energy into the earth according to claim 9, further including the step of lowering each of the rods to the ground and maintaining the lower ends of the rods in continuous contact with the ground as the acoustic energy is delivered into the earth.

11. The process for delivering acoustic energy into the earth according to claim 9, wherein the rods are successively thrust against the ground and recoiled away from the ground without losing contact with the ground to deliver a series of impulses into the earth such that the timing for the impact, recoiling and successive impact progresses through a frequency spectrum to include a range of frequencies for acquiring reflections from the earth at geophones arrayed across a survey area.

12. The process for delivering acoustic energy into the earth according to claim 9, wherein the step of actively isolating the acoustic energy comprises controlling movement of active shock absorber elements to actively counteract the propagation of the acoustic energy back to the remainder of the seismic source.

13. The process for delivering acoustic energy into the earth according to claim 11, wherein the active isolation system further include reactive shock absorbers.

14. The process for delivering acoustic energy into the earth according to claim 12, wherein the reactive shock absorbers include pneumatic bladder elements.

15. The process for delivering acoustic energy into the earth according to claim 12, wherein the reactive shock absorbers include hydraulic shock absorbers.

16. The process for delivering acoustic energy into the earth according to claim 12, wherein the reactive shock absorbers include at least one spring.

* * * * *